United States Patent
Nakatani et al.

(10) Patent No.: US 6,452,381 B1
(45) Date of Patent: Sep. 17, 2002

(54) MAGNETORESISTIVE TYPE POSITION DETECTING DEVICE

(75) Inventors: Shinji Nakatani, Okazaki (JP); Hirofumi Uenoyama, Nishikasugai-gun (JP); Takamasa Kinpara, Kariya (JP)

(73) Assignee: Denso Corporation (JP)

(*) Notice: Subject to any disclaimer, the term of this patent is extended or adjusted under 35 U.S.C. 154(b) by 0 days.

(21) Appl. No.: 09/198,567

(22) Filed: Nov. 23, 1998

(30) Foreign Application Priority Data

Nov. 28, 1997 (JP) .............................. 9-328996

(51) Int. Cl.⁷ .............................. G01B 7/30; G01D 5/16
(52) U.S. Cl. .............................. 324/207.21; 324/207.25
(58) Field of Search .............................. 324/207.21, 207.24, 324/207.25, 174, 235, 207.12; 338/32 R

(56) References Cited

U.S. PATENT DOCUMENTS

| | | | |
|---|---|---|---|
| 3,846,697 A | * 11/1974 | Cila et al. ............... | 324/207.21 |
| 5,021,736 A | 6/1991 | Gonsalves et al. | |
| 5,359,287 A | 10/1994 | Watanabe et al. | |
| 5,450,009 A | 9/1995 | Murakami | |
| 5,585,719 A | 12/1996 | Endo et al. | |
| 5,596,272 A | * 1/1997 | Busch ................... | 324/207.21 |
| 5,637,995 A | 6/1997 | Izawa et al. | |
| 5,644,226 A | 7/1997 | Aoyama et al. | |
| 5,801,529 A | * 9/1998 | Umemoto et al. ...... | 324/207.12 |
| 6,020,736 A | 2/2000 | Aoyama et al. | |

FOREIGN PATENT DOCUMENTS

| | | |
|---|---|---|
| CH | 682349 A | 8/1993 |
| DE | 3041041 A1 | 5/1982 |
| DE | 9312612.3 | 10/1993 |
| DE | 19649400 A1 | 12/1997 |
| EP | 0580207 A1 | 1/1995 |
| WO | WO 92/10723 | 6/1992 |

OTHER PUBLICATIONS

U.S. patent application Ser. No. 08/511,621, Nakatani et al., filed Aug. 7, 1995.

* cited by examiner

*Primary Examiner*—Walter E. Snow
(74) *Attorney, Agent, or Firm*—Nixon & Vanderhye PC

(57) ABSTRACT

In a position detecting device for a moving object, such as a camshaft gear, having ridges and valleys, magnetoresistive elements are disposed in positions offset in the rotation direction of the moving object from the magnetic center of a bias magnetic field projected by a bias magnet. The direction of the bias magnetic field is different when the moving object is in a ridge position from when it is in a valley position. A mid-point potential of the MREs is taken as the output of an MRE bridge to obtain an output value which is different when the moving object is in the ridge position from when it is in the valley position. It is thus possible to distinguish between the ridge position and the valley position of the moving object.

24 Claims, 6 Drawing Sheets

MAGNETORESISTIVE TYPE POSITION DETECTING DEVICE

CROSS REFERENCE TO RELATED APPLICATION

This application relates to and incorporates herein by reference Japanese Patent Application No. 9-328996 filed on Nov. 28, 1997.

BACKGROUND OF THE INVENTION

Field of the Invention

The present invention relates to a position detecting device for detecting position of a moving body by the use of a magnetoresistive element (MRE), and particularly to a rotation detecting device used for engine control or braking control in a vehicle.

The ignition timing of an engine is determined on the basis of crankshaft angle position and camshaft angle position. For example in a four-stroke engine, because the camshaft attains one rotation for every two rotations of the crankshaft, cylinder identifying information is provided within one rotation of the camshaft and ignition timing information is provided in one rotation of the crankshaft.

Conventional rotation detecting devices use, as shown in FIGS. 9A and 9B, a bias magnet 102 to project a bias magnetic field toward a camshaft gear 101 to detect the rotation position of the camshaft 101 by detecting with an MRE 103 the direction of the field as it displaces on the basis of the ridges (gear tooth convexities) 101a and valleys (gear tooth concavities) 101b of the camshaft gear. 101 changing from ridge to valley and from valley to ridge.

In FIGS. 9A and 9B, it is shown respectively that the gear 101 is in a valley position and in a ridge position at the detection position in a static state immediately before the gear 101 starts to rotate, that is, on engine startup. In the figures the magnetic field projected toward the gear 101 by the bias magnet 102 is shown by arrows.

The orientation of the lines of magnetic force (direction of the magnetic field) passing through the MRE 103 is the same between cases when the gear 101 is in the ridge position and in the valley position. The output waveforms of the MRE 103 in these respective positions are shown in FIG. 10. During the period of from when the power supply is switched on until the first point of change (point of change from ridge to valley or a point of change from valley to ridge of the gear 101 (period T), the output waveforms of the MRE 103 are the same for both positions.

Consequently, in this period T it cannot detect whether the gear 101 is in a ridge position or in a valley position, and therefore the correct position of the gear 101, cannot be detected. Thus, it is impossible for the ignition timing, that is, which cylinder should be ignited, to be determined from the position of the gear 101, and consequently the;, first one of the cylinders to be ignited upon engine starting cannot be identified and is not ignited the first time.

SUMMARY OF THE INVENTION

It is therefore an object of the present invention to provide a position detecting device which can detect the position of a moving body from a static state immediately before the moving body starts to move.

According to a first aspect of the present invention, a resistive element group including at least one magnetoresistive element is disposed in a position offset in a moving direction of a gear of a moving body from the magnetic center of a bias magnetic field projected by a bias magnet. Thus, the direction of the bias magnetic field is made different when the gear position changes to a valley position from a ridge position. This change in the bias magnetic field is used to obtain an output of the magnetoresistive element unit. It is possible to obtain an output value that is different when the gear is in the valley position from when it is in the ridge position. It is possible to distinguish between the ridge position and the valley position of the gear from the static state immediately after power-on, i.e., before the moving body starts to move.

Preferably, there is also provided another magnetoresistive element unit. The first magneto resistive unit is made up of first and second magnetoresistive elements, and the second magnetoresistive element unit is made up of third and fourth magnetoresistive elements. The first magnetoresistive unit is disposed in a position offset from the magnetic center of a bias magnetic field in a moving, direction of a gear of a moving body. The second magnetoresistive element unit is disposed in a position offset from the magnetic center of the bias magnetic field in the opposite direction to the first including at least one magnetoresistive element. The outputs of the third and fourth magnetoresistive elements in addition to the first and second magnetoresistive elements are used to detect movement of the moving body.

BRIEF DESCRIPTION OF THE DRAWINGS

Other objects, features and advantages of the present invention will become more apparent from the following detailed description made with reference to the accompanying drawings. In the drawings.

DETAILED DESCRIPTION OF THE PREFERRED EMBODIMENT (First Embodiment)

A first preferred embodiment of a position detecting device is applied as a rotation detecting device for engine crankshaft angle position detection.

Figure 1A:
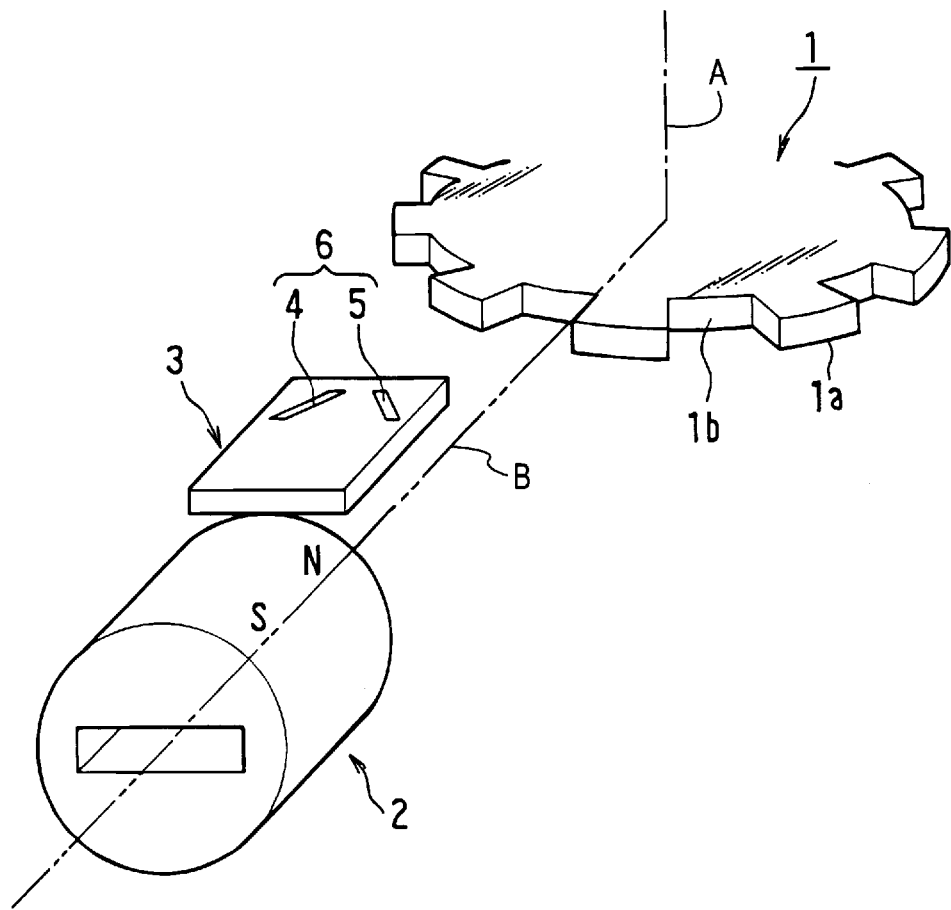
FIGS. 1A and 1B are a schematic view showing a position detecting device and an electric wiring diagram showing a circuit for processing an output of an MRE, respectively, according to a first preferred embodiment of the present invention.

As shown in FIG. 1A, the position detecting device has a gear 1 made of a magnetic material, a bias magnet 2 and an integrated circuit (IC) chip 3. The gear 1 has ridges 1a and valleys 1b arranged regularly around its circumference. The gear 1 is disposed so that its outer circumferential surface faces the bias magnet 2, and the bias magnet 2 projects a bias magnetic field toward the outer circumferential surface of the gear 1.

The bias magnet 2 is hollow, and the center axis of the bias magnet 2 forms the magnetic center of the bias magnetic field. The bias magnet 2 is magnetized so that one end surface side thereof is the N pole and the other end surface side is the S pole. The bias magnet 2 is disposed so that the surface thereof nearer to the gear 1 is the N pole and the surface further from the gear 1 is the S pole, and so that the rotational axis of the gear 1 (one-dot chain line A in FIG. 1A) is positioned approximately on the center axis of the bias magnet 2 (double-dot chain line B in FIG. 1A).

Two magnetoresistive elements (MREs) 4, 5 are formed with different orientations in an upper (front) surface of the IC chip 3 as a magnetoresistive unit. The two MREs 4 and 5 are disposed so that their length directions respectively make angles of 45° and −45° to the magnetic center of the bias magnetic field (center axis of the bias magnet 2) in directions parallel with an end surface 1b of the gear 1, that is, so that they form the shape of the non-parallel sides of a regular trapezium. It is ensured that even when there is a large change in the deflection angle in the bias magnetic field, no waveform break arises in the outputs of the MREs 4 and 5.

To detect the direction of the bias magnetic field projected by the bias magnet 2, the IC chip 3 is disposed between the bias magnet 2 and the outer circumferential surface of the gear 1. At this time, the two MREs 4, 5 are disposed offset from the magnetic center of the bias magnetic field in the rotation direction of the gear 1. There are no particular limitations on the amount by which the two MREs 4, 5 are offset from the magnetic center of the bias magnetic field. However, preferably, on the basis of the strength and the direction of the bias magnetic field projected by the bias magnet 2, this is made an amount such that the two MREs 4 and 5 can detect the direction of the bias magnetic field well. The IC chip 3 is disposed so that the two MREs 4 and 5 are positioned between the planes formed by the side end surfaces of the gear 1.

The MREs 4 and 5 are processed into wiring so that current flows through them in their respective length directions. These two MREs 4, 5 are connected in series to form a single MRE bridge 6. Current flows through this MRE bridge 6 from the MRE 5 to the MRE 4. A change in the bias magnetic field projected by the bias magnet 2, that is, rotation of the gear 1, is detected using the mid-point potential of these two MREs 4, 5 connected in series as the output of the MRE bridge 6.

Figure 1B:
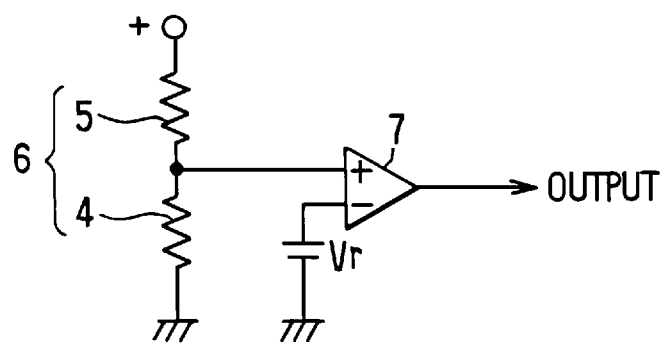

Specifically, as shown in FIG. 1B, the output of the MRE bridge 6 is inputted into a non-inverting input terminal of a comparator 7 and binarized by comparison with a predetermined threshold voltage Vr inputted into an inverting input terminal of the comparator 7. Then, on the basis of the output of this comparator 7, the rotation of the gear 1, that is, whether the ridge 1a faces the MRE bridge 6 (ridge position) or the valley 1b faces the MRE bridge 6 (valley position), is detected.

The IC chip 3 is received inside the hollow bias magnet 2 and then encapsulated with mold resin (not shown) together with the bias magnet 2. The output signal from the MRE bridge 6 is extracted by means of terminals extending to outside through the mold resin.

Figure 2:
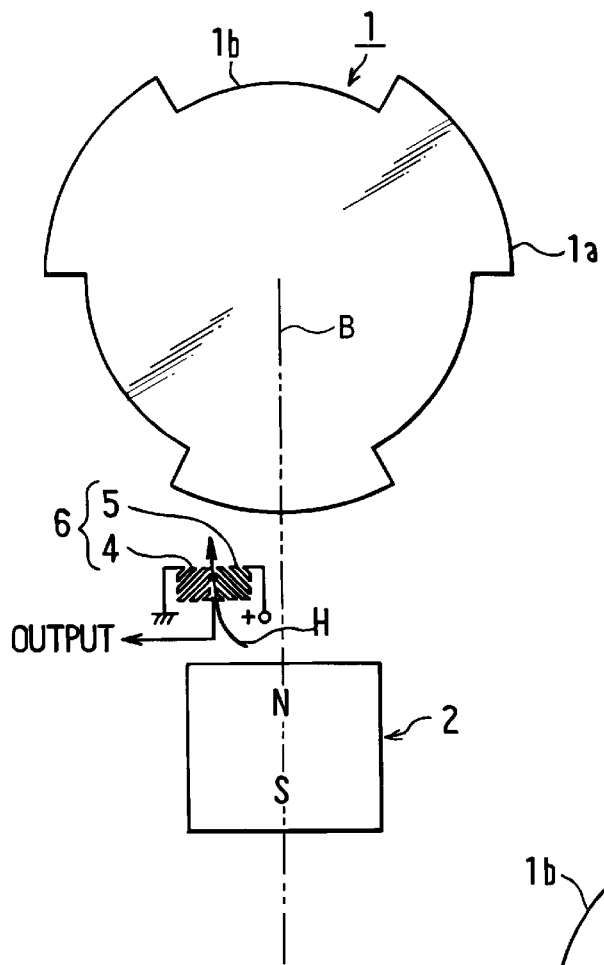
FIG. 2, is a schematic view showing the direction of lines of magnetic force when a gear is in a ridge position in the first embodiment.
Figure 3:
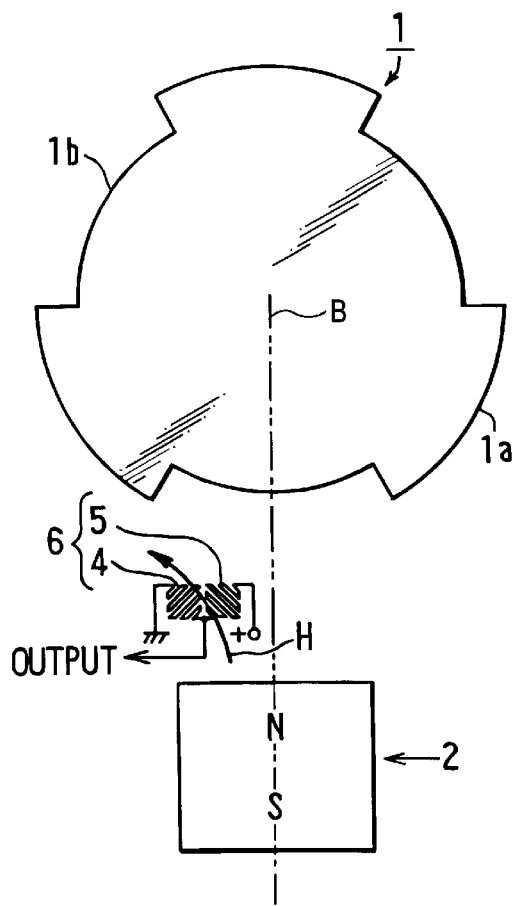
FIG. 3 is a schematic view showing the direction of lines of magnetic force when the gear is in a valley position.

FIG. 2 and FIG. 3 show the magnetic force H projected by the bias magnet 2. As shown by the arrow in FIG. 2, when the gear 1 is in the ridge position, the lines of magnetic force H projected by the bias magnet 2 deflect in a direction substantially parallel with the center axis of the bias magnet 2 (the double-point line B in the figure). This is because since the ridge 1a is closer to the bias magnet 2 than the valley 1b is, the projected lines of magnetic force H are drawn toward that ridge 1a.

When as shown by the arrow in FIG. 3 the gear 1 is in the valley position, the lines of magnetic force H projected by the bias magnet 2 swing away from the center axis of the bias magnet 2 in a plane parallel with the upper and lower surfaces of the gear 1. This is because since the ridge 1a has moved away from the bias magnet 2 and the gear 1 is farther from the bias magnet 2, the lines of magnetic force H are projected in a state similar to that of when they extend from the N pole toward the S pole.

Figure 4A:
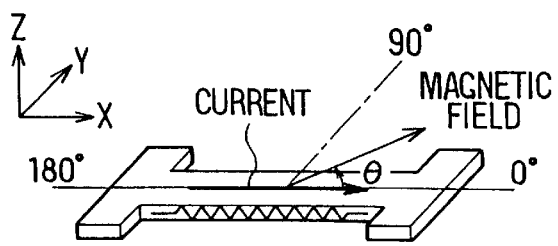
FIGS. 4A and 4B are schematic view and a graph showing a change in the magnetic resistance in the first embodiment.
Figure 4B:
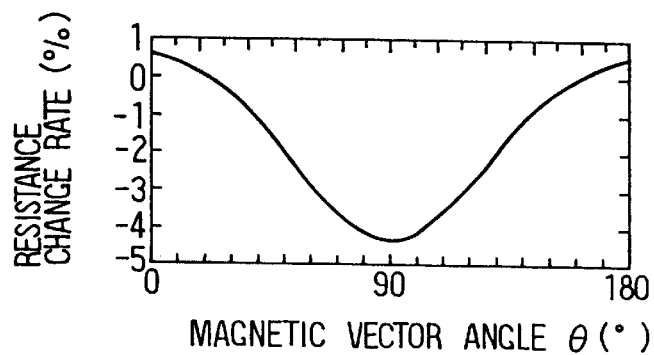
Figure 5:
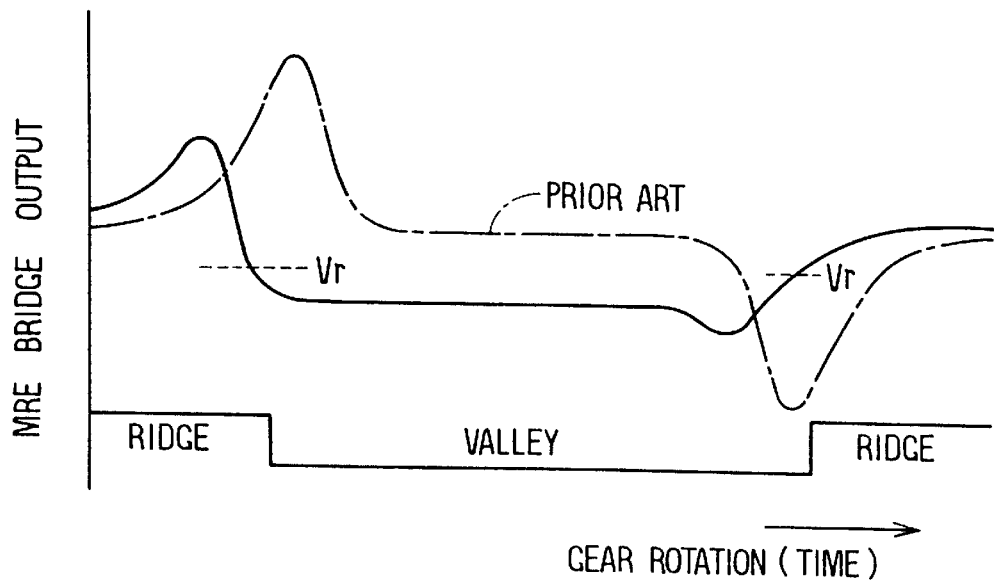
FIG. 5 is a graph showing an output waveform of an MRE bridge in the first embodiment.

Thus, along with rotation, of the gear 1, the lines of magnetic force H projected from the bias magnet 2 swing in a plane parallel with the upper and lower surfaces of the gear 1. That is, when the upper surface of the IC chip 3 is taken as an X-Y plane and X, Y and Z axes centering on the MREs 4 and 5 are considered, the lines of magnetic force H swing in the X-Y plane as shown in FIG. 4A. A resistance change rate of the MREs 4 and 5 provided when the lines of magnetic force H swing in the X-Y plane is shown in FIG. 4B. The output waveform of the MRE bridge 6 accompanying rotation of the gear 1 is shown in FIG. 5. For comparison, an output waveform of the MRE bridge in the conventional device is also shown in FIG. 5.

First, when the gear 1 is in the ridge position as shown in FIG. 2, because the lines of magnetic force H are projected substantially in parallel with the center axis of the bias magnet 2, their magnetic vector angle θ to the MRE 4 is about 135° and their magnetic vector angle θ to the MRE 5 is about 45°.

Then, when as shown in FIG. 3 the gear 1 is in the valley position, because the lines of magnetic force H are projected in a direction such that they move away from the center axis of the bias magnet 2, their magnetic vector angle θ to the MRE 4 is smaller than 135° and their magnetic vector angle θ to the MRE 5 also is smaller than 45°.

In this case, the resistance of the MRE 4 decreases and the resistance of the MRE 5 increases. Consequently, the mid-point potential of the MRE bridge 6, i.e., the output of the MRE bridge 6, falls. Therefore, the output of the MRE bridge 6 is different when the gear 1 is in the valley position from what it is when the gear is in the ridge position.

As shown in FIG. 5, whereas the output waveform of the MRE bridge in the prior art (one-dot chain line in the figure) has substantially the same value when the gear 1 is in the ridge position as it does when the gear 1 is in the valley position. However, in this embodiment the output waveform of the MRE bridge 6 (solid line in the figure) assumes a different value in each case. Therefore, in this embodiment it is possible to determine whether the gear 1 is in the ridge position or in the valley position on the basis of comparison of the output of the MRE bridge 6 and the threshold voltage Vr. It is thereby possible for the position of the ridges 1a to be correctly determined even in a stationary state immediately before the gear 1 rotates.

(Second Embodiment)

Figure 6A:
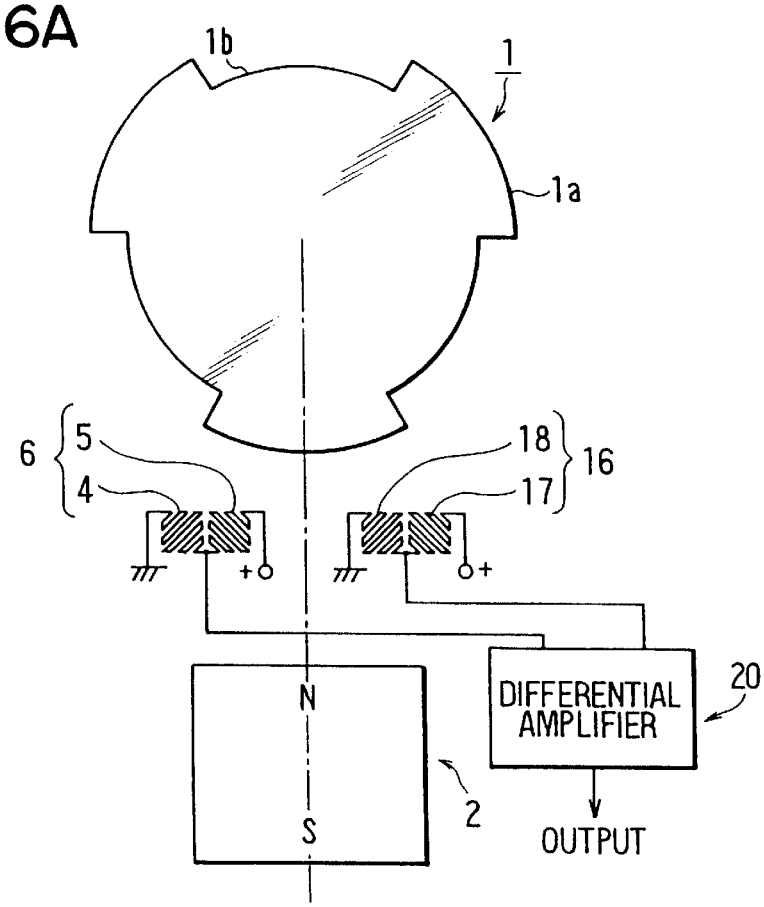
FIGS. 6A, 6B and 6C are a schematic view showing a position detecting device and electric wiring diagrams of a circuit for processing outputs of MREs, respectively, according to a second preferred embodiment of the invention.
Figure 6B:
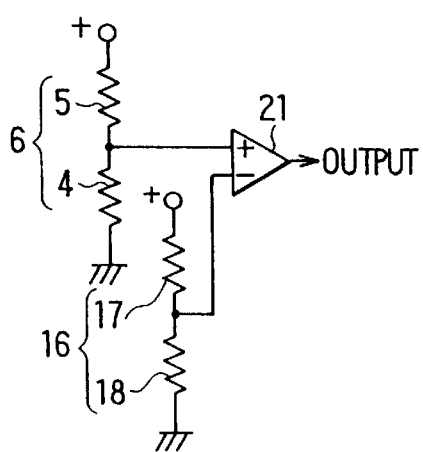
Figure 6C:
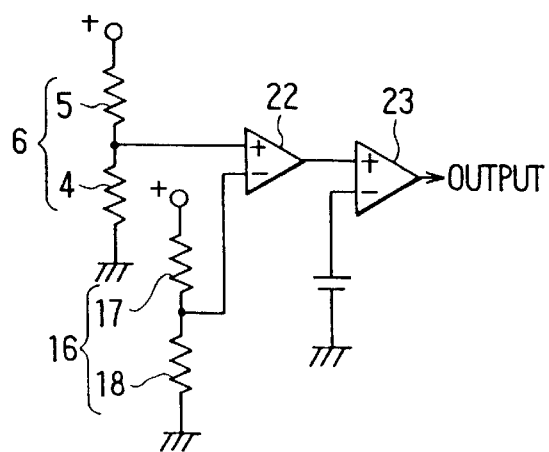

In a second embodiment shown in FIGS. 6A through 6C, rotation position detection is carried out using two units, MRE bridges 6, 16. That is, in this embodiment, in addition to the MRE bridge 6, another MRE bridge 16 is provided.

The MRE bridge 16 is disposed line-symmetrically with the MRE bridge 6 about the center: axis of the bias magnet 2 (magnetic center of the bias magnetic field) That is, this MRE bridge 16 is made up of an MRE 17 line-symmetrical with the MRE 4 and an MRE 18 line-symmetrical with the MRE 5.

The MRE 17 and the MRE 18 are connected in series so that current flows from the MRE 17 to the MRE 18. The mid-point potential of the MREs 17, 18 is taken as the output of the MRE bridge 16.

The outputs of the MRE bridge 6 and the MRE bridge 16 are both inputted into a differential amplifier circuit 20. As shown in FIG. 6B, the differential amplifier circuit 20 is constructed to compare the mid-point potentials of the two MRE bridges 6, 16 by means of a comparator 21, and the output signal of this comparator 21 is used to detect the rotation position of the gear 1.

Figure 7:
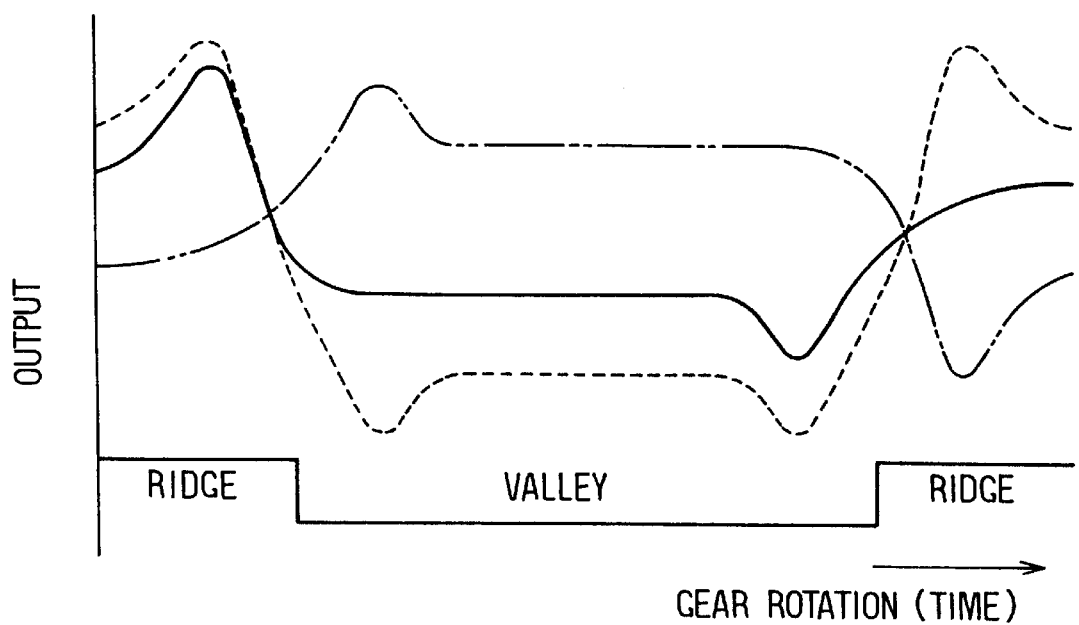
FIG. 7 is a time chart showing output waveforms of MRE bridges in the second embodiment.

The respective output waveforms of the two MRE bridges 6, 16 and a waveform expressing the difference between the outputs of the two MRE bridges 6, 16 are shown in FIG. 7. More specifically, the output of the MRE bridge 6 is shown by the solid line, and the output of the MRE bridge 16 is shown by the two-dot chain line. The difference between the two outputs is shown by the dotted line. As shown in this figure, because the difference between the outputs of the MRE bridges 6, 16 is large, the binarization processing in the differential amplifier circuit 20 can be carried out more accurately. Consequently, the detection of whether the gear 1 is in the ridge position or the valley position can be carried out even more reliably.

Figure 8:
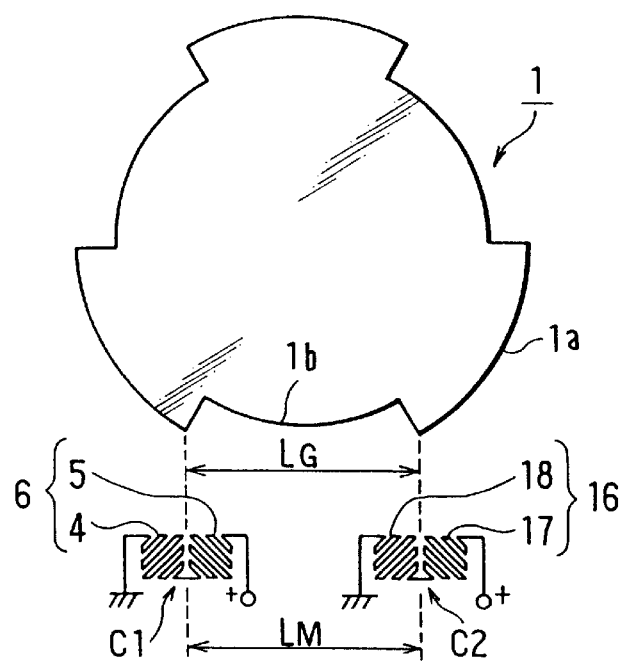
FIG. 8 is a schematic view showing a modification of the second embodiment.
Figure 9A:
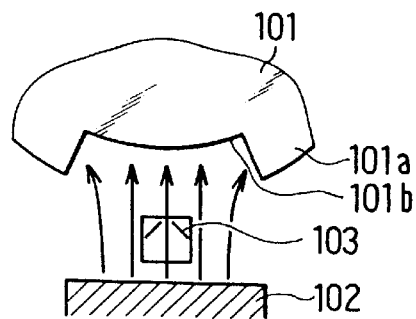
FIGS. 9A and 9B are schematic views showing the direction of lines of magnetic force passing through an MRE in a conventional device.
Figure 9B:
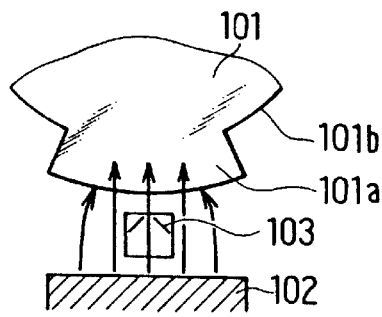
Figure 10:
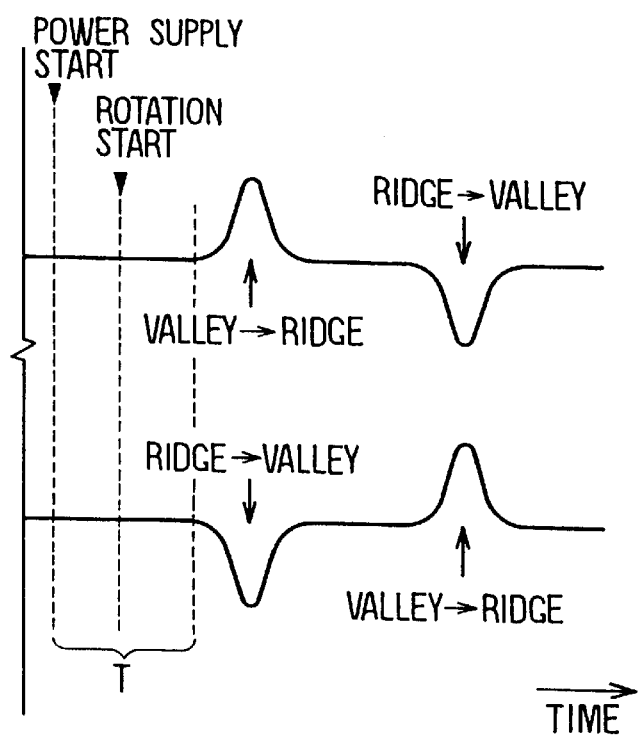
FIG. 10 is a time chart showing output waveforms in the conventional device.

In this embodiment, preferably, the relationship between the spacing LM of the two MRE bridges 6, 16 and the width LG of the valley 1b between the ridges 1a is so determined as preferably LG>LM, as shown in FIG. 8. Here, it is assumed that the spacing LM between the two MRE bridges 6, 16 is defined as the distance between the connection point C1 of the patterns of the MREs 4, 5 and the connection point C2 of the patterns of the MREs 17, 18.

With this relationship, although the bias direction of the bias magnetic field is sometimes somewhat regulated by the ridges 1a, a substantially open flux state (state of the lines of magnetic force H shown in FIG. 3) is obtained and the outputs from the connection points of the MRE bridge 6 and the MRE bridge 16 can be surely made reverse in phase. Thus, the output of the differential amplifier circuit 20 can be made large as shown in FIG. 7.

Because when the difference between the output of the MRE bridge 6 and the output of the MRE bridge 16 is small there may be cases wherein a sufficient output cannot be obtained from the differential amplifier circuit 20, the differential amplifier circuit 20 may alternatively be constructed as shown in FIG. 6C.

That is, as shown in the first embodiment, when the gear 1 is in the ridge position, the lines of magnetic force H are substantially parallel with the center axis of the bias magnet 2. In this case the outputs of the two MRE bridges 6, 16 are both almost the same, and hence it may not be possible to obtain a sufficient output of the differential amplifier circuit 20.

In the case of circuit construction shown in FIG. 6C, it is possible to obtain a sufficient output from the differential amplifier circuit 20 by first amplifying the differential with an amplifier 22 and then binarizing this output by comparing it with a specified threshold voltage in a comparator 23.

It is assumed in the above embodiment that when the gear 1 is in the ridge position, the lines of magnetic force H are substantially parallel with the center axis of the bias magnet 2. In fact, however, the orientation of the lines of magnetic force H is determined by the shape of the magnet 2 and its positional relationship with the gear 1. Therefore, there are cases where the above assumption is not possible.

For example, when the gear 1 has moved from the valley position to the ridge position, the orientation of the lines of magnetic force H may become such that they cross a line parallel with the center axis of the bias magnet 2 and converge further toward the center axis side. In this case, because the directions of the lines of magnetic force H passing through the respective MRE bridges 6, 16 are different, the differential amplifier circuit 20 generates an ample output. Consequently, in this case, it is possible for rotation position detection to be carried out accurately using the differential amplifier circuit 20 shown in FIG. 6B.

When on the other hand the relationship between the distance LM and the width LG is LG<LM, because even if a gear concavity 1c surfaces each of the MRE bridges the bias magnetic field will head for the ridges 1a at the ends of the gear concavities 1c, an output difference between the MRE bridge 6 and the MRE bridge 16 will not be obtained. Consequently, in this case, a differential output will not be obtained.

(Other Embodiments)

In the above embodiments, detection of whether the gear 1 is in the ridge position or the valley position is made possible by the MRE bridges 6, 16 being offset from the magnetic center of the bias magnetic field in a plane parallel with the end surface 1b of the gear 1; however, the same effects can be obtained by disposing the MRE bridges 6, 16 away from the magnetic center even if they are not in a plane parallel with the top (upper) or bottom (lower) surface of the gear 1.

For example, the MRE bridge 6 may be disposed in a position offset from the magnetic center of the bias magnetic field in a plane parallel with the top surface of the gear 1 and then further offset by a predetermined amount in a direction perpendicular to the top surface of the gear 1.

Further, when the MRE bridge 6 is offset from the magnetic center of the bias magnetic field in a plane parallel with the top surface of the gear 1, the IC chip 3 may be offset by a predetermined angle with respect to a plane parallel with the top surface of the gear 1.

However, in these cases also, it is necessary for the respective positions of the MREs 4, 5 to be not equidistant from the magnetic center of the bias magnetic field.

The bias magnet 2 need not be formed into a hollow shape. It may be in a solid cylinder shape or a rectangular parallelopiped shape.

The present invention should not be limited to the disclosed embodiments and modifications, but should cover other variations which may be attained without departing from the spirit of the invention.

What is claimed is:

1. A position detecting device comprising:
   a moving object having a ridge and a valley arranged alternately thereon;
   a bias magnet for projecting a bias magnetic field toward the ridge and the valley of the moving object; and
   a resistive element group including at least one magnetoresistive element disposed between the moving object and the bias magnet, and responsive to a change in direction of the bias magnetic field caused by movement of the moving object,
   wherein the resistive group including at least one magnetoresistive element is disposed in a position offset in a moving direction of the moving object from a magnetic center of the bias magnetic field corresponding to a center axis of the bias magnet in order that an output signal of the resistive element group produced when the ridge of the moving object faces the bias magnet is different in signal level from an output signal of the resistive element group produced when the valley of the moving object faces the bias magnet in a stationary state of the moving object, wherein the resistive element group including at least one magnetoresistive element includes a first magnetoresistive element and a second magnetoresistive element, and the first and second magnetoresistive elements are formed on a surface of a substrate that is arranged substantially in parallel with the moving direction of the moving object, and wherein the first and second magnetoresistive elements are connected in series and arranged so that a center axis therebetween is laterally offset from and parallel to the magnetic center of the bias magnetic field.

2. A position detecting device as in claim 1, wherein the moving object is a rotary gear, and the first and second magnetoresistive elements are both disposed in a position offset from the magnetic center of the bias magnetic field in the moving direction of the rotary gear.

3. A position detecting device as in claim 1, wherein:

the first magnetoresistive element and the second magnetoresistive element are disposed so as to make angles of about 45° to the magnetic center of the bias magnetic field and form the shape of the non-parallel sides of a regular trapezium, and the center axis of the regular trapezium the shape of whose non-parallel sides is formed by the first magnetoresistive element and the second magnetoresistive element is disposed in a position offset from the magnetic center of the bias magnetic field in the moving direction of the moving object.

4. A position detecting device as in claim 1, wherein:

the first magnetoresistive element and the second magnetoresistive element are connected in series to form a first magnetoresistive element bridge, and a potential between the first magnetoresistive element and the second magnetoresistive element is taken as an output signal of the first magnetoresistive element bridge.

5. A position detecting device as in claim 1, further comprising:

another resistive element group including at least one magnetoresistive element disposed between the moving body and the bias magnet and having third and fourth magnetoresistive elements, and responsive to a change in the bias magnetic field caused by movement of the moving body, wherein the another resistive element group including at least one magnetoresistive element is disposed in a position offset from the magnetic center of the bias magnetic field in the moving direction of the moving object in the opposite direction from the first resistive element group including at least one magnetoresistive element.

6. A position detecting device as in claim 5, wherein:

the third magnetoresistive element and the fourth magnetoresistive element are connected in series a potential between the third magnetoresistive element and the fourth magnetoresistive element is taken out, and two outputs of the resistive element groups are applied to a circuit for comparison therebetween.

7. A position detecting device as in claim 6, wherein the circuit includes:

means for amplifying a difference between the two outputs; and means for comparing the amplified difference with a predetermined threshold value.

8. A position detecting device as in claim 1, wherein:

the output produced from the resistive element group when the valley of the rotating member reaches a position facing the bias magnet and the output produced from the resistive element group when the ridge reaches the position facing the bias magnet are different in signal level.

9. A position detecting device as in claim 8, wherein:

the bias magnet is in a hollow shape, and the resistive element group is formed on a substrate held in the bias magnet.

10. A position detecting device as in claim 5, wherein the width of the valley is wider than the spacing between the two resistive element groups.

11. A position detecting device as in claim 1 wherein:

the output signal of the resistive element group including at least one magnetoresistive element produced when the ridge of the moving object faces the bias magnet and the output signal of the magnetoresistive element group produced when the valley of the moving object faces the bias magnet have substantially zero slope.

12. A position detecting device as in claim 1 wherein:

the output signal of the resistive element group produced when the ridge of the moving object faces the bias magnet and the output signal of the resistive element group produced when the valley of the moving object faces the bias magnet are different from an output signal produced when an edge between the ridge and the valley of the moving object faces the bias magnet.

13. A position detecting device as in claim 1, wherein:

the first and the second magnetoresistive elements are disposed on a plane substantially parallel with a planar surface of the moving object.

14. A position detecting device as in claim 5 wherein:

the third and the fourth magnetoresistive elements are disposed on a plane substantially parallel with a planar surface of the moving object.

15. A position sensing device for detecting the stationary position of a rotatable member having alternating ridges and valleys thereabout, said device comprising:

a biasing magnetic field generator disposed to provide a biasing magnetic field directed toward said rotatable member about a biasing magnetic field axis;

at least one MRE unit disposed within said biasing magnetic field and comprising a plurality of magnetoresistive elements symmetrically disposed with respect to each other in said unit about an MRE unit axis that is offset from said biasing magnetic field axis; and a bridge circuit connection of said magnetoresistive elements with at least one electrical signal amplifier which produces discernibly different output signals when the rotatable member is stationary corresponding respectively to the positions of a ridge or a valley thereof with respect to the sensing device.

16. A method for detecting the stationary position of a rotatable member having alternating ridges and valleys thereabout, said method comprising:

generating a biasing magnetic field disposed to provide a biasing magnetic field directed toward said rotatable member about a biasing magnetic field axis;

disposing at least one MRE unit within said biasing magnetic field, said unit comprising a plurality of magnetoresistive elements symmetrically disposed with respect to each other in said unit about an MRE unit axis that is offset from said biasing magnetic field axis; and sensing a signal from a bridge circuit connection of said magnetoresistive elements with at least one electrical signal amplifier which produces discernibly different output signals when the rotatable member is stationary corresponding respectively to the positions of a ridge or a valley thereof with respect to the sensing device.

17. A position detecting device according to claim 5, wherein the moving object is a rotary gear, and the planar surface is parallel to a surface of the rotary gear perpendicular to rotational axis of the rotary gear.

18. A position detecting device according to claim 13, wherein the moving object is a rotary gear, and the planar surface is parallel to a side surface of the rotary gear perpendicular to rotational axis of the rotary gear.

19. A position detecting device according to claim 5, wherein the plurality of magnetoresistive elements are disposed on a surface of a substrate that is substantially arranged in parallel with a side surface of the rotatable member perpendicular to rotational axis of the rotatable member.

20. A method for detecting the stationary position of a rotatable member according to claim 16, wherein the plurality of magnetoresistive elements are disposed on a side surface of a substrate that is substantially arranged in parallel with a surface of the rotatable member perpendicular to rotational axis of the rotatable member.

21. A position sensing device according to claim 15, wherein an output signal produced when an edge between the ridge and the valley of the rotatable member is substantially changed in comparison with an output signal produced when the ridge or valley of the rotatable member faces the biasing magnet.

22. A position sensing device according to claim 16, wherein an output signal produced when an edge between the ridge and the valley of the rotatable member is substantially changed in comparison with an output signal produced when the ridge or valley of the rotatable member faces the biasing magnet.

23. A position detecting device comprising:

a moving object having a ridge and a valley arranged alternately thereon;

a bias magnet for projecting a bias magnetic field toward the ridge and the valley of the moving object; and a resistive element group including at least one magnetoresistive element disposed between the moving object and the bias magnet, and responsive to a change in direction of the bias magnetic field caused by movement of the moving object, wherein the resistive group including at least one magnetoresistive element is disposed in a position offset in a moving direction of the moving object from a magnetic center of the bias magnetic field corresponding to a center axis of the bias magnet in order that an output signal of the resistive element group produced when the ridge of the moving object faces the bias magnet is different in signal level from an output signal of the resistive element group produced when the valley of the moving object faces the bias magnet in a stationary state of the moving object, and wherein the resistive element group including at least one magnetoresistive element includes a first magnetoresistive element and a second magnetoresistive element, the first and second magnetoresistive elements being connected in series and arranged so that a center axis therebetween is laterally offset from and parallel to the magnetic center of the bias magnetic field, and further comprising:

another resistive element group including at least one magnetoresistive element disposed between the moving body and the bias magnet and having third and fourth magnetoresistive elements, and responsive to a change in the bias magnetic field caused by movement of the moving body, wherein the another resistive element group including at least one magnetoresistive element is disposed in a position offset, in the moving direction of the moving object from the magnetic center of the bias magnetic field, in the opposite direction from the first resistive element group including at least one magnetoresistive element.

24. A position detecting device as in claim 23, wherein said third and fourth magnetoresistive elements are connected in series and arranged so that a center axis therebetween is laterally offset from and parallel to the magnetic center of the bias magnetic field, said center axis of said third and fourth magnetoresistive elements being offset in said opposite direction from the center axis of the first and second magnetoresistive elements.

* * * * *